US012688659B2

(12) United States Patent
Ouchi

(10) Patent No.: US 12,688,659 B2
(45) Date of Patent: Jul. 21, 2026

(54) IMAGE PROCESSING DEVICE AND IMAGE PROCESSING METHOD

(71) Applicant: CANON KABUSHIKI KAISHA, Tokyo (JP)

(72) Inventor: Kenji Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 18/461,685

(22) Filed: Sep. 6, 2023

(65) Prior Publication Data

US 2024/0104866 A1     Mar. 28, 2024

(30) Foreign Application Priority Data

Sep. 27, 2022     (JP) ................................. 2022-153492

(51) Int. Cl.
G06T 19/00          (2011.01)
G06T 5/50           (2006.01)
(Continued)

(52) U.S. Cl.
CPC .............. *G06T 19/006* (2013.01); *G06T 5/50* (2013.01); *G06T 5/70* (2024.01); *G06V 10/56* (2022.01); *G06V 10/60* (2022.01); *G06T 2207/10024* (2013.01); *G06T 2207/20221* (2013.01); *G06T 2207/30168* (2013.01)

(58) Field of Classification Search
None
See application file for complete search history.

(56) References Cited

U.S. PATENT DOCUMENTS 6,633,304 B2     10/2003  Anabuki
10,152,775 B1 *  12/2018  Bellows .................... G06T 5/80
(Continued)

FOREIGN PATENT DOCUMENTS

JP     2002-163670 A     6/2002
JP     2005-107968 A     4/2005

OTHER PUBLICATIONS

Yuta Nakashima, et al., "AR image generation using view-dependent geometry modification and texture mapping," retrieved from <https://naist.repo.nii.ac.jp/record/3882/files/24-VIRE-S-14-00020.pdf>, Sep. 7, 2016, pp. 1-14.
(Continued)

*Primary Examiner* — David H Chu
(74) *Attorney, Agent, or Firm* — Venable LLP

(57) ABSTRACT

An image processing device includes a first acquisition unit, a second acquisition unit, a correction unit, and a control unit. The first acquisition unit acquires a real space image obtained by capturing a real space and first image quality information, which is image quality information on the real space image. The second acquisition unit acquires a virtual object and second image quality information, which is image quality information on the virtual object. The correction unit corrects image quality of the real space image and image quality of the virtual object based on the first image quality information and the second image quality information. The control unit controls a display to display a combined image obtained by combining the real space image and the virtual object whose image qualities are corrected by the correction unit.

16 Claims, 6 Drawing Sheets

(51) Int. Cl.
  *G06T 5/70*     (2024.01)
  *G06V 10/56*    (2022.01)
  *G06V 10/60*    (2022.01)

(56)         References Cited

U.S. PATENT DOCUMENTS

| | | | | | |
|---|---|---|---|---|---|
| 10,447,937 | B2 | 10/2019 | Ouchi | | |
| 11,402,871 | B1 * | 8/2022 | Berliner | .................... | G06F 3/02 |
| 2002/0057280 | A1 * | 5/2002 | Anabuki | ................. | G06F 3/011 |
| | | | | | 345/633 |
| 2012/0236119 | A1 * | 9/2012 | Rhee | ..................... | G01S 3/7864 |
| | | | | | 348/46 |
| 2016/0104452 | A1 * | 4/2016 | Guan | .................... | G06F 3/0304 |
| | | | | | 345/633 |
| 2017/0061693 | A1 * | 3/2017 | Kohler | ................. | G06T 19/006 |
| 2018/0040156 | A1 | 2/2018 | Kondo | | |
| 2019/0306434 | A1 * | 10/2019 | Annau | ................. | H04N 23/698 |
| 2021/0201587 | A1 * | 7/2021 | Mehr | ........................ | G06T 7/75 |
| 2022/0084289 | A1 * | 3/2022 | Casaburo | .............. | G06T 19/006 |
| 2022/0343562 | A1 * | 10/2022 | Hirschfield | ........... | G06T 11/001 |
| 2023/0030260 | A1 * | 2/2023 | Jauvin | ..................... | A63F 13/53 |
| 2023/0106201 | A1 * | 4/2023 | Liu | ....................... | G06T 19/006 |
| | | | | | 345/419 |

OTHER PUBLICATIONS

May 19, 2026 Japanese Official Action in Japanese Patent Appln. No. 2022-153492.

* cited by examiner

| ITEM | REAL SPACE IMAGE | 3DCG |
|---|---|---|
| COLOR | LANDSCAPE | PORTRAIT |
| WHITE BALANCE | AUTO | SUNLIGHT |
| BRIGHTNESS | 0 | + 1 |
| NOISE REDUCTION | WEAK | WEAK |
| HOW LIGHT IS INCIDENT | SIDE LIGHTING | FRONT LIGHTING |

FIG. 5B

| ITEM | REAL SPACE IMAGE | 3DCG |
|---|---|---|
| COLOR | PORTRAIT | PORTRAIT |
| WHITE BALANCE | SUNLIGHT | SUNLIGHT |
| BRIGHTNESS | 0 | 0 |
| NOISE REDUCTION | WEAK | WEAK |
| HOW LIGHT IS INCIDENT | SIDE LIGHTING | SIDE LIGHTING |

FIG. 5C

| ITEM | REAL SPACE IMAGE | 3DCG |
|---|---|---|
| COLOR | PORTRAIT | PORTRAIT |
| WHITE BALANCE | SUNLIGHT | SUNLIGHT |
| BRIGHTNESS | +1 | +1 |
| NOISE REDUCTION | WEAK | WEAK |
| HOW LIGHT IS INCIDENT | SIDE LIGHTING | FRONT LIGHTING |

IMAGE PROCESSING DEVICE AND IMAGE PROCESSING METHOD

BACKGROUND OF THE INVENTION

Field of the Invention

The present invention relates to an image processing device and an image processing method.

Description of the Related Art

In recent years, mixed reality (MR) technology has been studied. MR technology is a technology that seamlessly combines a real space and a virtual space (space generated by a computer). Among MR technologies, augmented reality (AR) technology that displays a virtual space superimposed on a real space is attracting attention.

A video see-through display device displays a combined image in which an image of a virtual space (a virtual object drawn by computer graphics, character information, or the like) is superimposed on a video of a real space captured by an imaging device.

One of the challenges in the AR technology is to smoothly merge a virtual object with a real space without causing a sense of incongruity. Therefore, it is important that the virtual object is generated in view of the real space.

Japanese Patent Application Publication No. 2002-163670 describes a technique for improving visibility by detecting a color tone of a predetermined region of a real space image and determining a color tone of a virtual object based on the detected color tone.

However, the technique disclosed in Japanese Patent Application Publication No. 2002-163670 is a technique for newly determining, based on a real space, a color tone of an image of a virtual object whose color tone is not set. Therefore, in a case where, for example, a virtual object is generated from an image obtained by capturing an object in the past, it is assumed that image quality (color, white balance (WB), brightness, noise reduction, how light is incident, or the like) of the virtual object differs from image quality of the real space image.

SUMMARY OF THE INVENTION

Thus, it is an object of the present invention to realize a combined image obtained by combining a virtual object with a real space image, the combined image giving little sense of incongruity.

An aspect of the invention is an image processing device including at least one memory and at least one processor which function as: a first acquisition unit configured to acquire a real space image obtained by capturing a real space and first image quality information, which is image quality information on the real space image; a second acquisition unit configured to acquire a virtual object and second image quality information, which is image quality information on the virtual object; a correction unit configured to correct image quality of the real space image and image quality of the virtual object based on the first image quality information and the second image quality information; and a control unit configured to control a display to display a combined image obtained by combining the real space image and the virtual object whose image qualities are corrected by the correction unit.

An aspect of the invention is an image processing method, including: a first acquisition step of acquiring a real space image obtained by capturing a real space and first image quality information, which is image quality information on the real space image; a second acquisition step of acquiring a virtual object and second image quality information, which is image quality information on the virtual object; a correction step of correcting image quality of the real space image and image quality of the virtual object based on the first image quality information and the second image quality information; and a control step of controlling a display to display a combined image obtained by combining the real space image and the virtual object whose image qualities are corrected in the correction step.

Further features of the present invention will become apparent from the following description of exemplary embodiments with reference to the attached drawings.

BRIEF DESCRIPTION OF THE DRAWINGS

FIG. 1 illustrates a main configuration of an image processing device according to Embodiment 1;

FIGS. 5A to 5C describe image quality according to Embodiment 1; and

DESCRIPTION OF THE EMBODIMENTS

Figure 2:
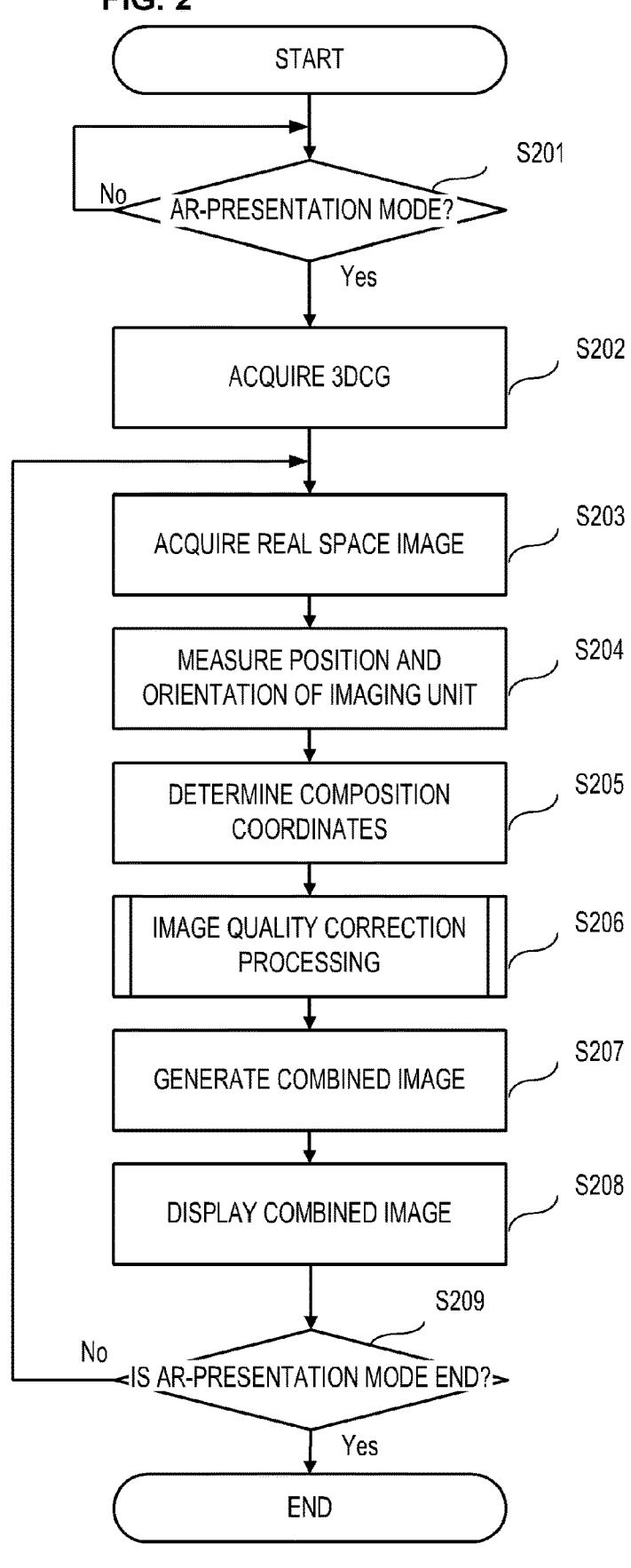
FIG. 2 is a flowchart illustrating image display processing according to Embodiment 1.

Hereinafter, an embodiment of the present invention will be described in detail with reference to the accompanying drawings.

Embodiment 1

Figure 1:
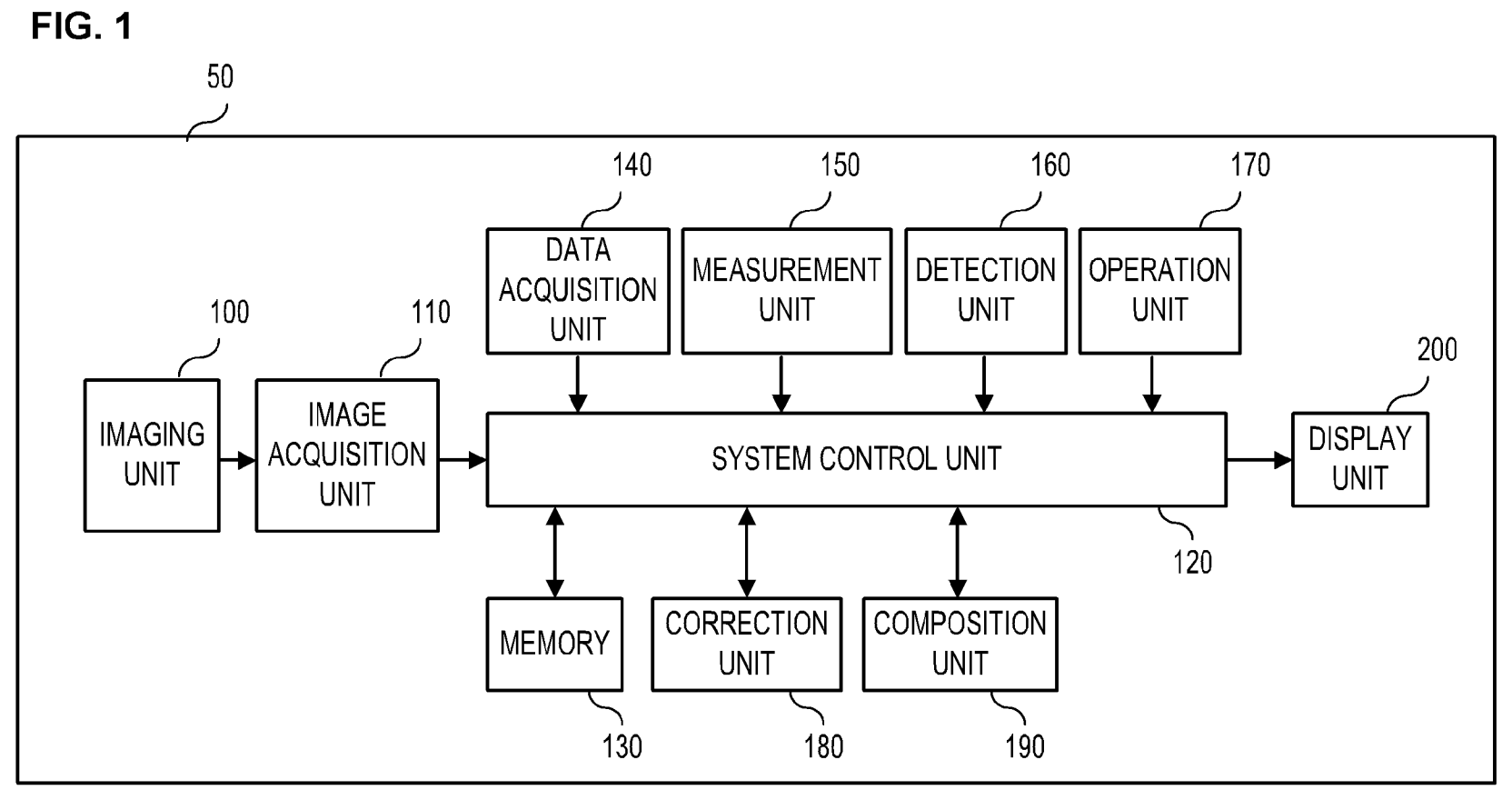

First, a main configuration of an image processing device 50 according to Embodiment 1 will be described with reference to FIG. 1. The image processing device 50 is, for example, an imaging device such as a digital camera. The image processing device 50 includes an imaging unit 100, an image acquisition unit 110, a system control unit 120, a memory 130, a data acquisition unit 140, a measurement unit 150, a detection unit 160, an operation unit 170, a correction unit 180, a composition unit 190, and a display unit 200.

The imaging unit 100 is an imaging sensor (camera). The imaging unit 100 captures a real space in real time.

The image acquisition unit 110 acquires a captured image (video; image data) of the real space from the imaging unit 100. The image acquisition unit 110 stores the acquired image (hereinafter, referred to as a "real space image") in the memory 130.

The system control unit 120 controls each component of the image processing device 50 in accordance with a program non-temporarily stored in a memory (storage medium) or the like.

The data acquisition unit 140 acquires three-dimensional computer graphics (3DCG) of a virtual object. For example, the data acquisition unit 140 may acquire one or more images and generate 3DCG based on the acquired images. When acquiring the 3DCG, the data acquisition unit 140 acquires shooting-time information from metadata added to the image used to generate the 3DCG and stores the acquired shooting-time information in the memory 130.

The shooting-time information includes at least one of information about camera settings at the time of shooting an image and analysis information obtained by analyzing the image by the image acquisition unit 110. The information about camera settings (camera setting information) is setting information applied to the captured image (information such as color, white balance, brightness, noise reduction, or shooting date and time (year, month, and day of the shooting) of the image). The analysis information is information such as a position of a light source, a direction of the light source, an intensity of the light source, how light is incident on a subject (an object), and a distance map. In the following description, information affecting image quality (information such as color, white balance, brightness, noise reduction, and how light is incident on a subject) in the shooting-time information is referred to as "image quality information". Note that "image quality" refers to how a display image appears, that is, how an image of a virtual object or a real space image appears.

The measurement unit 150 measures a position and orientation of the imaging unit 100 in a real space (three-dimensional space) and stores the measurement result in the memory 130. The measurement unit 150 includes a known three-dimensional-position measuring device (a gyro sensor, a GPS, a magnetic sensor, an optical sensor, an ultrasonic sensor, or the like). The measurement unit 150 may include only a single measuring device or may include a plurality of measuring devices.

In addition, for example, the measurement unit 150 performs image processing on a real space image of a landmark (a mark at a known position in the real space) captured by the imaging unit 100 and determines the position of the landmark. Here, the measurement unit 150 may calculate the position and orientation of the imaging unit 100 based on the position of the landmark. In this case, the measurement unit 150 calculates the position and orientation of the imaging unit 100 based on the correspondence relationship between the three-dimensional coordinates of the landmark in the real space and the two-dimensional coordinates of the landmark in the real space image. Further, based on the position and orientation information or the like measured by various measuring devices (sensors or the like), the measurement unit 150 may correct the position and orientation of the imaging unit 100 calculated based on the position of the landmark.

The detection unit 160 detects a change in a scene (such as a change in a shooting location or a shooting target) by analyzing the real space image. The detection unit 160 stores the detection result in the memory 130. The detection unit 160 determines that the scene has changed, for example, when the amount of change (the amount of change in color or brightness) in the angle of view of the real space image exceeds a first predetermined value or when the amount of movement of the subject exceeds a second predetermined value. The amount of change in color may be an amount of change in hue, saturation, or the like within a predetermined region or may be an amount of change in each region (region obtained by dividing the whole field angle by regions). The amount of change in brightness may be an amount of change in the average luminance value of a predetermined region or may be an amount of change in the distribution of the luminance histogram in a predetermined region. Conditions (the type of amount of change to be used, setting a predetermined value, or the like) for detecting the change in the scene may be switched in accordance with an application to be used.

The operation unit 170 includes, for example, a switch, a dial, a touch panel, a line-of-sight detection device (a device that realizes pointing by line-of-sight detection), or a voice recognition device. For example, when the shooting-time information is insufficient (or when the shooting-time information cannot be acquired), the user can make up for the insufficiency in the shooting-time information by operating the operation unit 170.

The correction unit 180 corrects image quality of a real space image and image quality of 3DCG of a virtual object based on image quality information on the real space image and image quality information on the 3DCG of the virtual object.

The composition unit 190 combines the real space image whose image quality has been corrected and the 3DCG of the virtual object whose image quality has been corrected. In this way, the composition unit 190 generates a combined image (composite image).

The display unit 200 includes a thin film transistor (TFT)-liquid crystal display (LCD) or the like. The display unit 200 sequentially displays combined images generated by the composition unit 190. This can make the user feel as if he or she were viewing the real space with the virtual object superimposed thereon in real time.

The image processing device 50 may be a device (a smartphone, a tablet terminal, or the like) that allows the user to hold by the hand and look into the display unit 200. The image processing device 50 may be a device that can be mounted on the head of the user, such as a head-mounted display (HMD). When the image processing device 50 is an HMD, the display unit 200 may include two display units corresponding to the left and right eyes, respectively, and the imaging unit 100 may be provided at each of the positions corresponding to the left and right eyes.

Image Display Processing

Image display processing, which is processing for displaying a combined image, will be described with reference to a flowchart in FIG. 2.

In step S201, the system control unit 120 determines whether the operation mode of the image processing device 50 is set to an AR-presentation mode. The AR-presentation mode is an operation mode that displays a combined image obtained by combining a real space image and 3DCG of a virtual object. If it is determined that the AR-presentation mode is set, the processing proceeds to step S202. If it is determined that the AR-presentation mode is not set, the processing of step S201 is repeated.

In step S202, the system control unit 120 controls the data acquisition unit 140 to acquire the 3DCG of the virtual object. The system control unit 120 may acquire one or more images and generate 3DCG from the images. A known method can be used as a method for generating the 3DCG of the virtual object. For example, 3DCG can be generated by a method in which the shape and depth of a specific subject are specified by using images of the subject captured from a plurality of directions. 3DCG may also be generated by a method in which the projections and depressions of a specific subject are formed by using an image obtained by capturing the subject and a distance map corresponding to the image. The 3DCG may only provide information about a surface that is visible from the user.

In step S203, the system control unit 120 acquires the real space image (image obtained by capturing a real space) from the imaging unit 100.

In step S204, the system control unit 120 controls the measurement unit 150 to measure the position and orientation of the imaging unit 100 in the real space.

In step S205, the system control unit 120 determines the coordinates, orientation (direction), and the like of the 3DCG to be placed in the real space so as to be used when the 3DCG is combined with the real space image. The coordinates and the orientation of the 3DCG may be changeable as appropriate in accordance with a user operation or may be determined by the system control unit 120. For example, the coordinates at which the 3DCG is to be superimposed may be determined such that the 3DCG is always displayed at a position at a predetermined distance from the center position of the display surface (display) of the display unit 200 to a specific direction (the depth direction, the horizontal and vertical directions, or the like). The system control unit 120 may fix the coordinates at which the 3DCG is to be superimposed to a specific position in the real space. In addition, the system control unit 120 may be configured to detect a specific landmark (index) in the real space and may determine the coordinates at which the 3DCG is to be superimposed and the orientation of the 3DCG based on the coordinates and the orientation of the landmark.

In step S206, the system control unit 120 controls the correction unit 180 to correct the image quality of the 3DCG and the image quality of the real space image. The processing (image quality correction processing) in step S206 will be described in detail below (see FIG. 3).

In step S207, the system control unit 120 causes the composition unit 190 to combine the two images (the real space image and the 3DCG) whose image qualities have been corrected in step S204 to generate a combined image.

In step S208, the system control unit 120 sends the combined image to the display unit 200. The display unit 200 displays the combined image.

In step S209, the system control unit 120 determines whether the AR-presentation mode is continued. If it is determined that the AR-presentation mode is continued, the processing returns to step S202. If it is determined that the AR-presentation mode is ended, the processing of this flowchart is ended. For example, when a specific button included in the operation unit 170 is pressed, the system control unit 120 determines that the AR-presentation mode is ended.

Image Quality Correction Processing; S206

Figure 3:
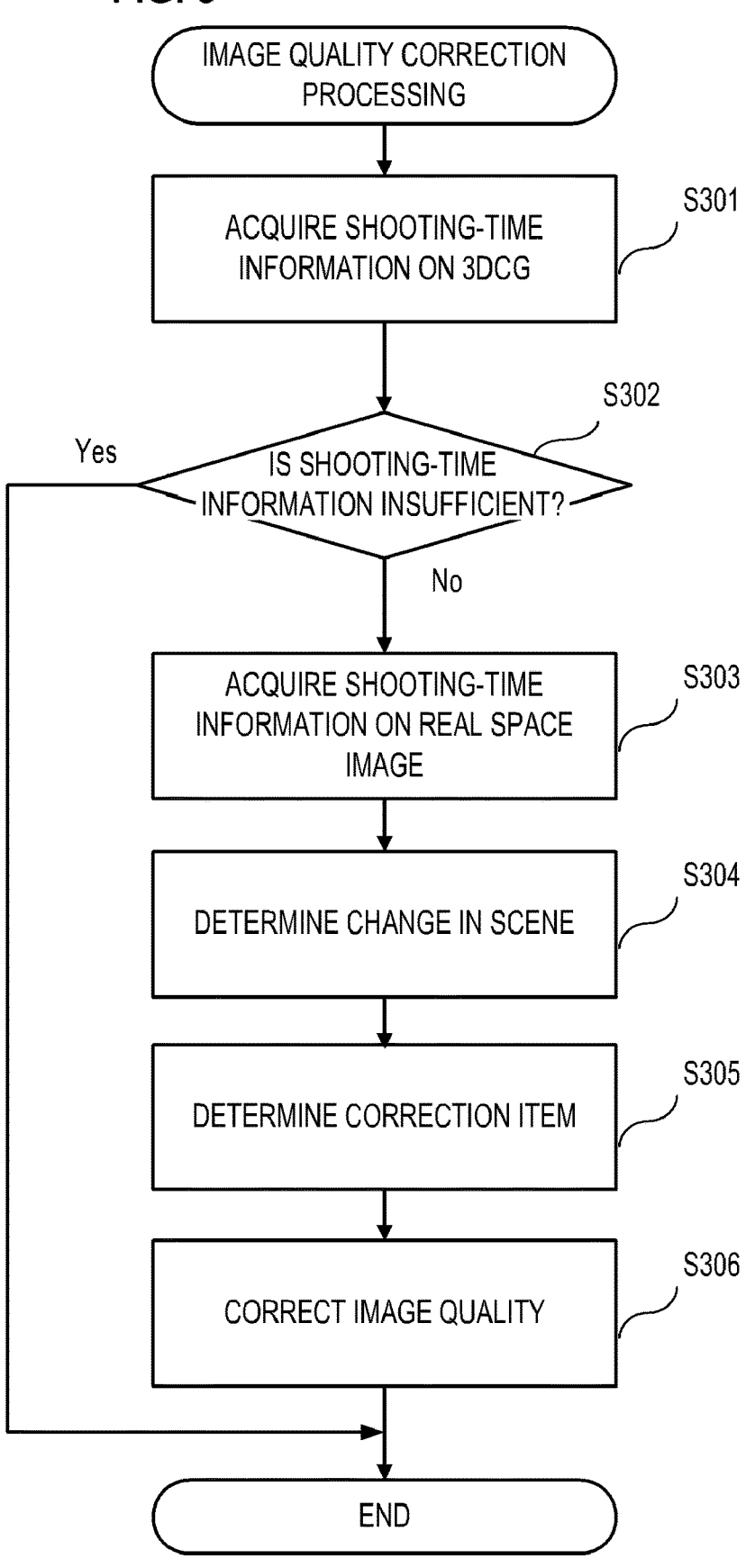
FIG. 3 is a flowchart illustrating image quality correction processing according to Embodiment 1.

The image quality correction processing in step S206 will be described with reference to a flowchart in FIG. 3.

In step S301, the system control unit 120 acquires shooting-time information on the 3DCG of the virtual object from metadata. In a case where the data acquisition unit 140 receives 3DCG from the outside, the system control unit 120 uses the metadata added to the 3DCG. In a case where the data acquisition unit 140 generates 3DCG from one image, the system control unit 120 uses the metadata of the image.

In a case where the data acquisition unit 140 uses a plurality of images to generate 3DCG, the system control unit 120 determines, for example, one representative image among the plurality of images and uses the metadata of the one representative image. The system control unit 120 may select one piece of metadata from the metadata of the plurality of images in accordance with the orientation (direction) of the 3DCG at the time of composition and use the selected piece of metadata. In addition, the system control unit 120 may use only metadata of "two or more images having the same information (setting) on a specific item of image quality (color, white balance, brightness, and the like)" among the metadata of the plurality of images.

In step S302, the system control unit 120 determines whether the shooting-time information (metadata) on the 3DCG acquired in step S301 is insufficient. If it is determined that the shooting-time information on the 3DCG is not insufficient, the processing proceeds to step S303. If it is determined that the shooting-time information on the 3DCG is insufficient, the processing of this flowchart ends. The state in which the shooting-time information is insufficient is a state in which information about a specific item (indispensable item) of the shooting-time information has not been acquired. The specific item may be, for example, determined in advance or may be settable (selectable) by the user.

In step S303, the system control unit 120 acquires shooting-time information on the real space image.

In step S304, the system control unit 120 causes the detection unit 160 to determine whether there is a change in a scene of the real space image (whether the detection unit 160 detects a change in a scene of the real space image).

In step S305, the system control unit 120 controls the correction unit 180 to determine an item (first correction item) whose setting is to be corrected among the setting items of the image quality of the 3DCG and an item (second correction item) whose setting is to be corrected among the setting items of the image quality of the real space image. Examples of the setting item of the image quality include color, white balance, brightness, noise reduction, and how light is incident, as illustrated in FIG. 5A. The correction unit 180 determines the first correction item and the second correction item based on the type of item included in the image quality information, the presence or absence of a change in the scene, and the like, which will be described below with reference to FIGS. 5A to 5C.

In step S306, the system control unit 120 controls the correction unit 180 to correct the image quality corresponding to the correction items determined in step S305. For example, the correction unit 180 corrects the setting of the first correction item of the 3DCG such that the setting of the first correction item of the 3DCG matches the setting of the first correction item of the real space image. The correction unit 180 may correct the setting of the second correction item of the real space image such that the setting of the second correction item of the real space image matches the setting of the second correction item of the 3DCG.

Determining Correction Item and Correcting Image Quality

Figure 4A:
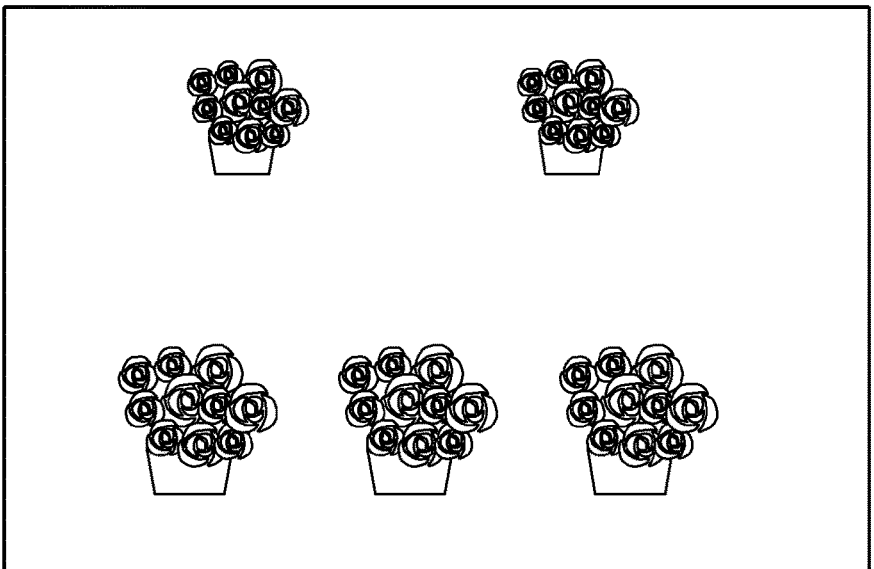
FIGS. 4A to 4C describe composition according to Embodiment 1.
Figure 4B:
Figure 4C:
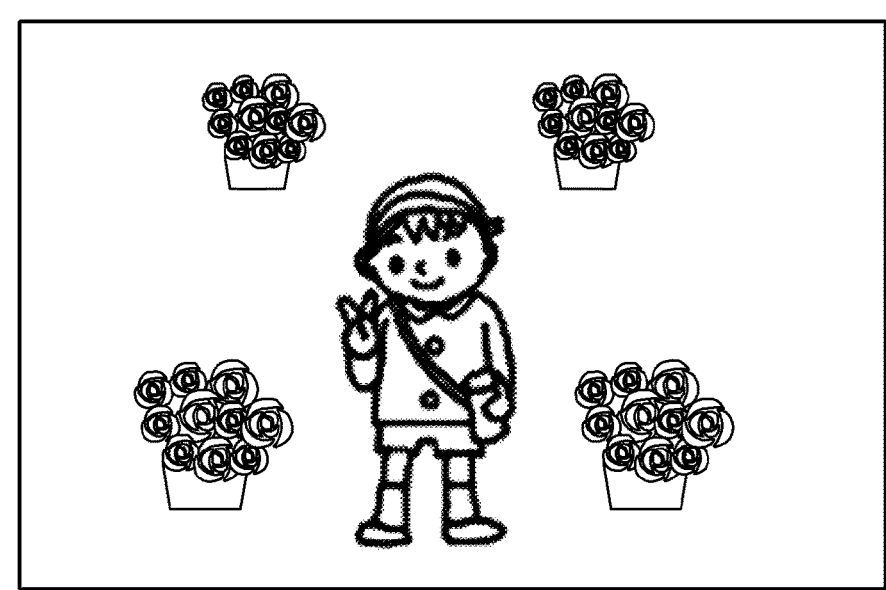

Specific examples of the processing for determining the correction item in step S305 and the processing for correcting the image quality in step S306 will be described. Hereinafter, an example in which a combined image illustrated in FIG. 4C is generated by combining a real space image illustrated in FIG. 4A and 3DCG illustrated in FIG. 4B will be described.

An object of the processing of step S306 is to merge the virtual object with the real space in the combined image by correcting the image quality of at least one of the real space image and the 3DCG. The information about the image quality (image quality information) includes at least one of pieces of information about color, white balance, brightness, noise reduction, and how light is incident on a subject.

FIGS. 5A to 5C illustrate examples of the settings of image quality before correction and the settings of image quality after correction for each of the real space image and the 3DCG. Although this example includes five items of image quality setting that can be correction targets, the correction unit 180 may change the items of the image quality setting that can be correction targets in accordance with the shooting-time information on the real space image, the metadata of the 3DCG, and the detection result of the change of the scene. Further, the number of items may be changeable in accordance with an application to be used or a user operation.

FIG. 5A illustrates an example of settings of image quality (=information indicated by image quality information) before image quality correction. In this example, the real space image and the 3DCG have different settings (information) except for the noise reduction. In the present embodiment, the color can be set to any one of "auto", "standard", "portrait", "landscape", "detail-oriented", "neutral", "faithful", "monochrome", and the like. The white balance can be set to any one of "auto", "sunlight", "shade", "cloudy", "incandescent lamp", "white fluorescent light", "strobe", "manual", "color temperature-specified", and the like. It is assumed that the brightness can be set in increments of one third from plus three levels to minus three levels.

FIG. 5B illustrates an example of settings (information) of image quality after correction in a case where the change in the scene is not detected in step S304. In the example in FIG. 5B, in step S305, the correction unit 180 determines the brightness, the noise reduction, and how light is incident as the first correction items. The correction unit 180 determines the color and the white balance as the second correction items.

In the example in FIG. 5B, in step S306, the correction unit 180 matches the settings of the second correction items (color and white balance) after correction for both the real space image and the 3DCG with the settings of the second correction items before correction for the 3DCG. In addition, the correction unit 180 matches the settings of the first correction items (brightness and how light is incident) after correction for both the real space image and the 3DCG with the settings of the first correction items before correction for the real space image.

In this way, the real space image is matched with the color and white balance of the subject, based on which the 3DCG of the virtual object is created, so that the atmosphere of the subject can be maintained in the combined image. In addition, the brightness of the 3DCG and how the light is incident thereon are matched with the brightness of the real space image and how the light is incident thereon. As a result, since the 3DCG is adjusted in such a manner that the 3DCG is affected by the environment (change) of the real space, the user can feel a sense that the combined image is an expansion of the real space. As a method for correcting (re-lighting) how light is incident on the 3DCG described above, an existing method can be used. For example, a method for setting a virtual light source may be used. In this method, light source information (information about a light source near the coordinates at which the 3DCG is to be superimposed) on the real space image is acquired from the shooting-time information on the real space image, and after the lighting effect on the 3DCG is cancelled, a virtual light source similar to the light source of the real space image is set to the 3DCG.

FIG. 5C illustrates an example of settings (information) of image quality after correction in a case where a change in the scene is detected in step S304. In the example in FIG. 5C, in step S305, the correction unit 180 does not determine the first correction item. That is, the correction unit 180 determines not to correct the image quality of the 3DCG in a case where a change in the scene is detected. The correction unit

180 determines the brightness as the second correction item, in addition to the color and the white balance.

Thus, in the example in FIG. 5C, in step S306, the correction unit 180 matches the color, white balance, and brightness after correction for both the real space image and the 3DCG with the color, white balance, and brightness of the 3DCG before correction. However, the correction unit 180 does not correct how the light is incident on the 3DCG. Since the scene has changed, the brightness of the real space image and the information (position, direction, and intensity) about the light source are highly likely to have changed from those before the change of the scene. Thus, if the image quality of the real space image is reflected on the 3DCG, the image quality of the 3DCG also continues to change, and this may cause the user to feel a discomfort in viewing the image. Therefore, in the example in FIG. 5C, the correction unit 180 does not correct the image quality of the 3DCG.

Note that the system control unit 120 may be configured not to change the settings of image quality of the real space image and the 3DCG (to maintain the current settings) for a certain period of time after determining the presence or absence of a change in the scene (or after a change in the scene is detected). In this way, for example, it is possible to prevent the settings of the image quality illustrated in FIG. 5B and the settings of the image quality illustrated in FIG. 5C from being frequently switched therebetween.

The composition unit 190 can also combine a plurality of different 3DCG with the real space image. In this case, the correction unit 180 corrects the image quality of the plurality of 3DCG and the image quality of the real space image based on the image quality information on the plurality of 3DCG and the image quality information on the real space image. Upon this correction, the correction unit 180 may correct the image quality of the plurality of 3DCG such that all the plurality of 3DCG have the same settings for all the setting items (or the same settings for at least a specific setting item) of the image quality so as not to give the user a sense of incongruity.

As described above, according to the present embodiment, first, the image quality of the real space image and the image quality of the 3DCG are corrected, and then, the real space image and the 3DCG are combined so that the virtual object can be smoothly merged with the real space. This realizes an image processing device capable of providing a combined image that gives little sense of incongruity.

In Embodiment 1, the system control unit 120 corrects the setting of the first correction item (brightness, noise reduction, how light is incident, or the like) of the 3DCG such that the setting of the first correction item of the 3DCG matches with the setting of the first correction item of the real space image. In addition, the system control unit 120 corrects the setting of the second correction item (color, white balance, or the like) of the real space image such that the setting of the second correction item of the real space image matches with the setting of the second correction item of the 3DCG. However, the system control unit 120 may adopt any method as long as the image quality is corrected on the basis of the image quality information on the real space image and the image quality information on the 3DCG. Thus, for example, the system control unit 120 may correct the respective settings of brightness of the real space image and the 3DCG to be the average of the setting of the brightness indicated by the image quality information on the real space image and the setting of the brightness indicated by the image quality information on the 3DCG.

In addition, in a case where a user preference on the strength of noise reduction is set in advance, the system control unit 120 may correct the respective settings of the noise reduction of the real space image and the 3DCG to be the setting corresponding to the user preference among the noise reduction setting indicated by the image quality information on the real space image and the noise reduction setting indicated by the image quality information on the 3DCG.

Modification 1

Image quality correction processing according to Modification 1 will be described with reference to a flowchart in FIG. 6. The processing of step S601 and step S602 in the flowchart in FIG. 6 replace the processing of step S302 in the flowchart in FIG. 3. Since the processing performed in steps S301 and S303 to S306 in the flowchart in FIG. 6 is the same as the processing performed in steps having the same step numbers in the flowchart in FIG. 3, description of these steps is omitted.

In step S601, the system control unit 120 determines whether the shooting-time information (metadata) on the 3DCG acquired in step S301 is insufficient. If it is determined that the shooting-time information on the 3DCG is not insufficient, the processing proceeds to step S303. If it is determined that the shooting-time information on the 3DCG is insufficient, the processing proceeds to step S602.

In step S602, the system control unit 120 makes up (compensates) for insufficient information in the shooting-time information. For example, the system control unit 120 makes up for insufficient information in the shooting-time information on the 3DCG in accordance with a user operation (user input) on the operation unit 170. Alternatively, the system control unit 120 may set the corresponding 3DCG not to be corrected.

Figure 6:
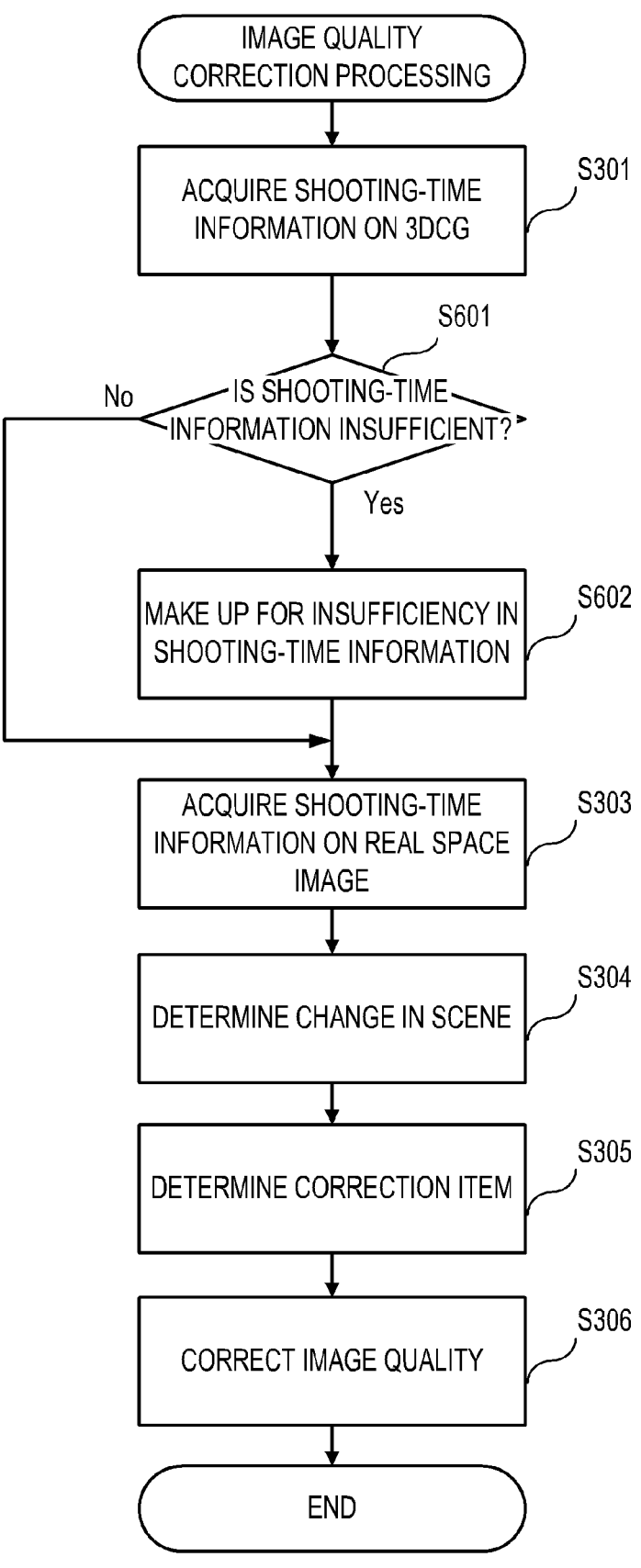
FIG. 6 is a flowchart illustrating image quality correction processing according to Modification 1.

As described above, in Modification 1, even when the shooting-time information (metadata) on the 3DCG is insufficient, image processing device 50 can combine the real space image and the 3DCG whose image qualities have been corrected by the processing of the flowchart in FIG. 6 and present the combined image to the user. Therefore, various types of 3DCG can be used to generate a combined image, and this allows the user to have more options of 3DCG.

Modification 2

Next, image quality correction processing according to Modification 2 will be described. In Modification 2, step S306 in the processing of the flowchart in FIG. 6 differs from that in Modification 1. Since the processing in steps other than step S306 is the same as the processing in Modification 1, description thereof will be omitted.

In step S306 in Modification 2, the system control unit 120 further corrects the image quality of the 3DCG based on time information (shooting date and time of the image; time stamp) included in the shooting-time information on the 3DCG. For example, the system control unit 120 sets the image quality such that the color fades in accordance with the age of the image used for creating the 3DCG. As a result, the image processing device 50 can make the user feel the flow of the times when displaying a plurality of 3DCG of the same subject over the ages.

More specifically, the system control unit 120 calculates the time elapsed from the shooting for generating the 3DCG based on, for example, the difference between time information about the 3DCG and time information about the real space image (=information indicating the current date and time). Next, in accordance with the calculated elapsed time, the system control unit 120 corrects the image quality of the 3DCG such that the 3DCG appears to have faded over the elapsed time (for example, such that the brightness of the 3DCG is decreased in accordance with the elapsed years).

According to the present invention, a combined image obtained by combining a virtual object with a real space image can be realized, the combined image giving little sense of incongruity.

In the above description, "if A is equal to or more than B, the processing proceeds to step S1, and if A is smaller (lower) than B, the processing proceeds to step S2" may be read as "if A is larger (higher) than B, the processing proceeds to step S1, and if A is equal to or less than B, the processing proceeds to S2". Conversely, "if A is larger (higher) than B, the processing proceeds to step S1, and if A is equal to or less than B, the processing proceeds to step S2" may be read as "if A is equal to or more than B, the processing proceeds to step S1, and if A is smaller (lower) than B, the processing proceed to step S2". Thus, unless a contradiction arises, the expression "equal to or more than A" may be replaced with "A or larger (higher; longer; more) than A" and may be read as or replaced with "larger (higher; longer; more) than A". The expression "equal to or less than A" may be replaced with "A or smaller (lower; shorter; less) than A" and may be read as or replaced with "smaller (lower; shorter; less) than A". In addition, the expression "larger (higher; longer; more) than A" may be read as "equal to or more than A", and the expression "smaller (lower; shorter; less) than A" may be read as "equal to or less than A".

The present invention has thus been described in detail based on the preferred embodiment. However, the present invention is not limited to this specific embodiment, and various embodiments without departing from the gist or scope of the present invention are included in the present invention. Part of the above-described embodiment may be appropriately combined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-153492, filed on Sep. 27, 2022, which is hereby incorporated by reference herein in its entirety.

What is claimed is:

1. An image processing device comprising:
at least one memory and at least one processor which function as a plurality of units comprising:
(1) a first acquisition unit configured to acquire a real space image obtained by capturing a real space and first image quality information, which is image quality information on the real space image;
(2) a second acquisition unit configured to (a) acquire at least one image, (b) generate a virtual object from the at least one image, and (c) acquire, from metadata added to the at least one image, second image quality information, which is image quality information on the virtual object;
(3) a correction unit configured to correct, based on the first image quality information and the second image quality information, image quality of at least one of the real space image and the virtual object; and
(4) a control unit configured to control a display to display a combined image obtained by combining the real space image and the virtual object, at least one of which having image quality that has been corrected by the correction unit.

2. The image processing device according to claim 1, wherein the at least one memory and the at least one processor further function as a detection unit configured to detect a change in a scene of the real space image, and
wherein the correction unit corrects the image quality of at least one of the real space image and the image quality of the virtual object based on (1) the change in the scene, (2) the first image quality information, and (3) the second image quality information.

3. The image processing device according to claim 2, wherein the correction unit corrects the image quality of the real space image without correcting the image quality of the virtual object in a case where the detection unit detects the change of the scene.

4. The image processing device according to claim 2, wherein the detection unit detects the change in the scene in a case where an amount of change in color or brightness within an angle of view of the real space image exceeds a first value or in a case where an amount of movement of an object within the angle of view exceeds a second value.

5. The image processing device according to claim 1, wherein the image quality information includes at least one of information of color, information of white balance, information of brightness, information of noise reduction, and information of how light is incident.

6. The image processing device according to claim 5, wherein the correction unit corrects a setting of a first item of the virtual object such that the setting of the first item of the virtual object matches a setting of a first item of the real space image, and
wherein the first item is at least one of noise reduction and how light is incident.

7. The image processing device according to claim 5, wherein the correction unit corrects a setting of a second item of the real space image such that the setting of the second item of the real space image matches a setting of a second item of the virtual object, and wherein the second item is at least one of color, white balance, and brightness.

8. The image processing device according to claim 1, wherein the second acquisition unit acquires the second image quality information from metadata added to one image among the at least one image.

9. The image processing device according to claim 1, wherein the second acquisition unit acquires the second image quality information from metadata of an image among the at least one image, the image corresponding to an orientation of the virtual object at a time of being placed on the combined image.

10. The image processing device according to claim 1, wherein the second acquisition unit acquires a plurality of images and generates the virtual object based on the plurality of images, and
wherein the second acquisition unit acquires the second image quality information from metadata of two or more images among the plurality of images, the two or more images having identical settings of color, white balance, and brightness.

11. The image processing device according to claim 1, wherein the correction unit does not correct the image quality of the virtual object in a case where specific information is insufficient in metadata acquired by the second acquisition unit.

12. The image processing device according to claim 1, wherein, in a case where specific information is insufficient in metadata acquired by the second acquisition unit, the correction unit compensates for insufficiency of the specific information in accordance with a user operation.

13. The image processing device according to claim 1, wherein the second acquisition unit acquires a plurality of virtual objects and the second image quality information on each of the plurality of virtual objects,
wherein the correction unit corrects, based on the first image quality information and a plurality of pieces of the second image quality information, the image quality of at least one of the real space image and the plurality of virtual objects such that the plurality of virtual objects have identical image quality settings, and
wherein the control unit displays the combined image obtained by combining the real space image and the plurality of virtual objects, at least one of the real space image and the plurality of virtual objects having had image quality corrected by the correction unit.

14. The image processing device according to claim 1, wherein the virtual object is generated on a basis of an image obtained by capturing an object,
wherein time information related to shooting date and time of the image obtained by capturing the object is set to the virtual object, and
wherein the correction unit corrects the image quality of the virtual object based on the time information, the first image quality information, and the second image quality information.

15. An image processing method comprising:
a first acquisition step of acquiring a real space image obtained by capturing a real space and first image quality information, which is image quality information on the real space image;
a second acquisition step of (a) acquiring at least one image, (b) generating a virtual object from the at least one image, and (c) acquiring, from metadata added to the at least one image, second image quality information, which is image quality information on the virtual object;

a correction step of correcting, based on the first image quality information and the second image quality information, image quality of at least one of the real space image and the virtual object; and a control step of controlling a display to display a combined image obtained by combining the real space image and the virtual object, at least one of which having image quality that has been corrected in the correction step.

16. A non-transitory computer-readable medium that stores a program, wherein the program causes a computer to execute an image processing method that includes:

a first acquisition step of acquiring a real space image obtained by capturing a real space and first image quality information, which is image quality information on the real space image;

a second acquisition step of (a) acquiring at least one image, (b) generating a virtual object from the at least one image, and (c) acquiring, from metadata added to the at least one image, second image quality information, which is image quality information on the virtual object;

a correction step of correcting, based on the first image quality information and the second image quality information, image quality of at least one of the real space image and the virtual object; and a control step of controlling a display to display a combined image obtained by combining the real space image and the virtual object, at least one of which having image quality that has been corrected in the correction step.

\* \* \* \* \*